United States Patent [19]

Noro

[11] Patent Number: 5,678,055

[45] Date of Patent: Oct. 14, 1997

[54] METHOD AND DEVICE FOR GENERATING GRÖBNER BASES TO REDUCE MEMORY USAGE AND INCREASE COMPUTING SPEED

[75] Inventor: Masayuki Noro, Kawasaki, Japan

[73] Assignee: Fujitsu Limited, Kawasaki, Japan

[21] Appl. No.: 343,912

[22] Filed: Nov. 17, 1994

[30] Foreign Application Priority Data

Nov. 22, 1993 [JP] Japan ................... 5-292194
Oct. 20, 1994 [JP] Japan ................... 6-255759

[51] Int. Cl.$^6$ ................................... G06F 5/00
[52] U.S. Cl. ............... 395/800; 395/500; 364/602; 364/608; 364/718; 364/735; 364/808; 364/231.3; 364/DIG. 1
[58] Field of Search .................... 395/800, 500; 364/602, 608, 718, 735, 808, 231.3, DIG. 1

[56] References Cited

U.S. PATENT DOCUMENTS

| 3,963,905 | 6/1976 | Gopinath et al. | 235/152 |
|---|---|---|---|
| 3,971,998 | 7/1976 | Gopinath et al. | 328/167 |
| 5,142,579 | 8/1992 | Anderson | 380/30 |
| 5,263,085 | 11/1993 | Shamir | 380/80 |
| 5,377,207 | 12/1994 | Perlman | 371/37.1 |

OTHER PUBLICATIONS

Williams et al., "Bounds and Analysis of Aliasing Errors in Linear Feedback Shift Registers", IEEE Transaction on computer Aided Design, vol. 7, No. 1, pp. 75–83. Jan. 1988.

Shoup, "New Algorithms for Finding Irreducible Polynomial over Finite Fields". IEEE, pp. 283–332. 1988.

Qian, "A Polynomial Approach to Image Processing and Quadtrees", IEEE, pp. 596–600. 1989.

Borgne, "Polynomial Ideal Therory Methods in Discrete Event, and Hybrid Dynamical Systems" IEEE, pp. 2695–2700. 1989.

Primary Examiner—Alyssa H. Bowler
Assistant Examiner—Dzung C. Nguyen
Attorney, Agent, or Firm—Staas & Halsey

[57] ABSTRACT

A method and device for generating the Gröbner bases to reduce the memory usage and compute at a high speed. The method comprises the steps of a) selecting a prime number, b) computing the normalization format of the polynomial pair regarding p as the modulus, c) computing the normalization format on the rational number only when the normalization format in the modulus p is not 0, d) omitting the computation of the normalization format on the rational number regarding the normalization format on the rational number as 0, when the normalization format in the modulus p is 0, and e) obtaining the polynomial set $F_1$ which is the Gröbner basis candidate. Thus, the digits of the intermediate formula are reduced, the memory usage is saved and the computing speed is accelerated. It is also possible to execute the computing after homogenizing previously the polynomial set F which is an object and dehomogenizing it at the end.

10 Claims, 8 Drawing Sheets

FIG. 2

CONSTRUCTION OF $a_n B^n + a_{n-1} B^{n-1} + \cdots + a_0$ $(0 \leq ai \leq B - 1)$

ON MEMORY

| l e n | a₀ | a₁ | · · · · · · · · · · · | $a_{n-1}$ | $a_n$ |
|---|---|---|---|---|---| len IS NUMBER OF DIGITS, NAMELY, n + 1

FIG. 3

REPRESENTATION OF sgn · a/b (a, b ARE NATURAL NUMBERS; sgn IS CODE

AND 1 OR – 1 )

| s g n | a | b |
|---|---|---| a, b IN FIG. ARE POINTERS TO MEMORY AREA WHICH INDICATES

NATURAL NUMBER DEFINED IN FIG. 2

FIG. 4

REPRESENTATION OF

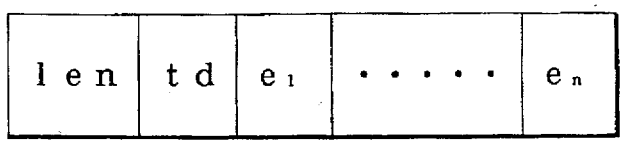 ($e_i$: INTEGRAL NUMBER ABOVE 0)

| l e n | t d | $e_1$ | · · · · · | $e_n$ | len IS NUMBER OF VARIABLES, NAMELY, n td IS TOTAL DEGREES, NAMELY $td = e_1 + \cdots + e_n$

FIG. 5

$c_1 \cdot t_1 + c_2 \cdot t_2 + \cdots + c_i \cdot t_i$ ($c_i$: RATIONAL NUMBER; $t_i$: TERM)

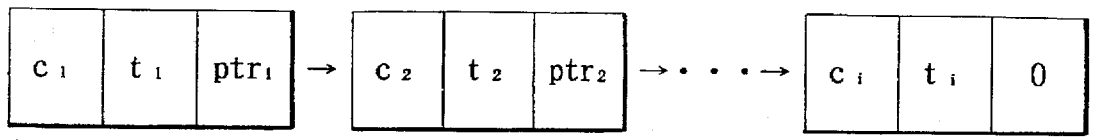

IN REALITY, COEFFICIENT c1, TERM $t_i$ IN FIG. ARE POINTERS TO MEMORY AREA WHICH INDICATES RATIONAL NUMBER, TERM DEFINED IN FIG. 3. BESIDES, $prt_i$ IS POINTER TO NEXT TERM IN FIG. $a_i$ IS POINTER TO POLYNOMIAL, NUMBER OR INTEGRAL NUMBER WITHIN SIZE PROVIDED BY COMPUTER AND SO ON $ptr_i$ IS POINTER TO AREA (CELL) WHICH INDICATES NEXT MEMBER $a_i$ IS THE SAME AS FIG. 6, len IS LENGTH OF ARRANGEMENT, NAMELY, m

METHOD AND DEVICE FOR GENERATING GRÖBNER BASES TO REDUCE MEMORY USAGE AND INCREASE COMPUTING SPEED

BACKGROUND OF THE INVENTION

1. Field of the Invention

The present invention is related to generating the Gröbner basis effective for solving the simultaneous algebraic equations and more particularly, to generating the Gröbner basis which is capable of executing the high speed computing and is capable of saving the memory resources.

2. Description of the Related Art

There are a lot of problems formulated by the simultaneous algebraic equations in industrial/technical fields, especially in the problems of the engineering. For instance, the problems formulated by the simultaneous algebraic equations imply such various topics as the problems relating to optimization of the system, the problems relating to the machine design, the inverse kinematical computation of the robot, and the solution of the partial differential equation. However, the general method for solving these problems algebraically and exactly is not known, and the numerical method for solution has been often relied on up to the present.

In recent years, some methods for solution based on the ideal theory has become known. A method using the Gröbner basis is one of them. The method is superior to other methods, since it is capable of obtaining the solution of the given equation without an excess or a shortage in a form that the numerical solution is easily obtained. However, the method has not been practically applied for solving the equations up to the present, since sometimes it happens that the computational volume of Gröbner basis becomes so large temporally and spatially.

The algorithm of generating the Gröbner basis is referred to as Buchberger's algorithm. It was designed by Buchberger and improved by a lot of people. The algorithm has been built into the computers and used by a lot of people. The main point of the algorithm is as follows.

```
Algorithm (1)
Input: polynomial set F
Output: Gröbner basis G of the ideal generated by F
(1)   D ← {{f, g} | f, g ∈ G; f ≠ g}
      do {
(2)     Remove the pair which is found to be normalized
        to 0 by a criterion from D
(3)     if D = 0 then return G
        else {
          C ← One element selected by a strategy from D
          D ← D - {C}
        }
(4)     P ← S polynomial of C
(5)     t = NF (P, G)
        if t ≠ 0 then {
          D ← D∪ { {f, t} | f ∈ G}
          G ← G∪ {t}
        }
      }
```

The brief description about the above algorithm is as follows.

1. Create the set D consisting of all the polynomial pairs constructed from the input polynomial set G and repeat the followings.

2. Remove the element which is found to be normalized to 0 by a certain strategy without computing from D.

3. Output G if D is an empty set. Take out the element C from D by a certain strategy and regard the rest as D again if D is not an empty set.

4. Create the S polynomial P from the polynomial pair C, and normalize it by G. Describe the normalization of P as NF (P, G).

5. Add all of the polynomial pairs consisting of each element of G and NF (P,G) to D if NF (P, G) is not 0, and add NF (P, G) to G.

The terms will be described. Hereupon, the polynomial is regarded as the sum of the monomial. The monomial is the power of a term and a coefficient, and the term is the product of the variables. One linear order is determined in the set of the terms, the biggest term of the terms appearing on the polynomial f according to the order is referred to as a head term and described as HT (f). The coefficient of HT (f) in f is described as HC (f). The S polynomial of the polynomial pair {f, g} is defined in HC (g)·t/HT (f)·f-HC (f)·t/HT (g)·g, when the least common multiple term of HT (f) and HT (g) is regarded as t. The fact that the polynomial f is reducible by the polynomial g means the case in which the term t of f that is divisible by HT (g) exists. In this case, erasing the term t of f by g means replacing f with f-c/HC (g)·t/HT (g)·g, when the coefficient of t in f is regarded as c. The normalization of f by the polynomial set G means repeating the erasion of the term of f by the element of G until each term of f becomes irreducible in relation to the all elements of G. The fact that the polynomial set G is a Gröbner basis means the case that all of the ideal elements generated by G are normalized to 0 by G. This is equivalent to normalizing the S polynomial of all polynomial pairs constructed from G to 0 by C.

The main improvement that has been executed in the algorithm up to the present is divided into two kinds of improvements as follows.

An improvement of a criterion for detecting the pair which is normalized to 0, namely, unnecessary pair in the second term.

An improvement of a criterion of the method for selecting a pair which will be an object of the normalization in the third term.

This is due to the fact that the normalization in the fourth term holds the major parts of the computational volume of the whole algorithm, and the later computational progress will vary greatly by the method for selecting a pair taken out in the third term, in spite of the fact that the computational result is always unique.

The criterion by Gebauer-Moeller is thought to be the best in the former at present, and the criterion according to phantom degree by Giovini and Mora is thought to be the best in the latter. In fact, each effectiveness is confirmed.

Gebauer, R. and Moeller, H. M. (1988). On an installation of Buchberger's algorithm. J. Symb. Comp. 6/2/3, 275–286.

Giovini, A. et al (1991). "One sugar cube, please," or Selection Strategies in the Buchberger's algorithm. Proc. ISSAC'91, 49–54.

However, it was impossible to remove the unnecessary pairs completely by the above improvements. Whether one pair of the remaining pairs is an unnecessary pair or not could be judged for the first time, after computation of the normalization was executed actually. Especially, the time necessary for normalizing the remaining unnecessary pairs often holds a greater part of the whole computational time depending on the problems, even if the unnecessary pairs are removed by the criterion.

The criterion by Gebauer-Moeller is so acute that sometimes it happens that the effort to remove more unnecessary pairs may result in increasing the cost for the computation on the contrary. For this reason, an effective way to reduce the cost necessary for the computation normalized to 0 as much as possible will be one of the big points for putting the algorithm into a practical use.

The cost for computing the normalization becomes so huge, since the coefficient which is an arbitrary multiple-length integral number often becomes an extremely large number in the midst of computation, despite of the fact that the result is 0 in the normalization of one polynomial. Accordingly, in the computation, the computer should be provided with a memory for storing the intermediate formula and needs a mass storage device.

Generally, there are some cases that a method called modular computing is used to avoid such an intermediate formula expansion. This is the method in which the result is replaced with a remainder divided by one integral number, namely, the modulus in the midst of an integral number computation, accordingly the intermediate formula expansion is controlled. However, the result obtained by the modular computing is generally different from the true result, and some operations will be needed to obtain the true result, when the size of the integral number appearing on the true result exceeds the size of the integral number selected as a modulus. Besides, the modulus is said to be appropriate when the result is equal to a result which is obtained by remainder-computing the coefficient of the true result, but there are no ways to guarantee that the modulus is always appropriate.

In method for computing Gröbner basis, some attempts to apply the modular computation to every step and to recover the true Gröbner basis from the result have been also made up to the present, but they have not been put into a practical use yet, since the size of the coefficient of the true result is unknown and it is difficult to confirm that the selected modulus is appropriate, so the termination of the algorithm is not guaranteed nor confirming the validity of the result is easy.

Winkler, F. (1988). A p-adic Approach to the Computation of Gröbner Bases J. Synb. Comp.6/2/3, 287–304.

Sasaki, T. and Takeshima, T.(1989). A Modular Method for Gröbner-basis Construction over Q and Solving System of Algebraic Equation. J. of Information Processing, Vol. 12, No. 4, 371–379.

And in article: Carlo Traverso (Pisa Univ.), Gröbner trace algorithms,Proc. ISSAC' 88, Lesture Notes in Computer Science 358, Springer-Verlag, an example in which the computation of Gröbner basis by the modular computing is executed first, a history of the normalization computation is stored at that time and the Gröbner basis is computed according to the history is described.

To put it concretely, the computation should be as follows.

1. First of all, compute the Gröbner basis in modulus p.

2. Store the history about the members and the terms in which the elimination was executed and the pairs normalized to 0, when the modular image of P is normalized in this process.

3. Compute the Gröbner basis on the rational number according to the history of the foregoing paragraph. At that time, Do not execute the normalization on the rational number in relation to the pairs normalized to 0 in the modulus p.

Execute the normalization on the rational number according to the history in relation to the pairs normalized to the polynomial which is not 0 in the modulus p.

Recover p and do the computation over from 1. assuming that the method for selecting p is not appropriate, when the normalization on the rational number does not correspond to the normalization in the modulus p (in reality, some operations for the recovery are adopted before doing the computation over).

4. Do the checking after the candidate of the Gröbner basis on the rational number is obtained. Recover p and return to 1. if the checking is failed.

In this method, if p is appropriate, there are some possibilities that the normalization on the rational number is executed rapidly, since there is no need to retrieve the terms to be eliminated when the normalization on the rational number is executed.

On the other hand, the fact that the inappropriate p was selected becomes clear in the step in which the Gröbner basis computation on the rational number is being executed according to the Gröbner basis computation in the modulus p, after the Gröbner basis computation in the modulus p was executed to the last. The sooner the step that the fact becomes clear is, the more wasteful computations are executed in the modulus p and the memory usage will be increased.

SUMMARY OF THE INVENTION

The purpose of the present inventionis to provide a method and device for generating the Gröbner basis which are capable of reducing the memory usage and executing high-speed-computing.

The present invention adopted the following means so as to solve the above-noted problems of the prior art.

(1) The present invention is a device for generating the Gröbner bases, provided with a computer for executing a Buchberger computing so as to generate the Gröbner basis based on a polynomial set F described in a memory and representing a simultaneous algebraic equations in relation to a model in which restrictions among parameters are given by the simultaneous equations, having a memory saving control unit for obtaining a polynomial set $F_1$ generated finally as a Gröbner basis candidate, the memory saving control unit comprising:

prime number selection means for selecting a prime number;

first computing means for computing a normalization format of the polynomial pair regarding p as the modulus;

determination means for determining whether the normalization format in the modulus p is 0 or not;

second computing means for computing the normalization format on a rational number when it is determined by the determination means that the normalization format in the modulus p is not 0; and omission means for omitting the computation of the normalization format on the rational number regarding the normalization format on the rational number as 0, when it is determined by the determination means that the normalization format in the modulus p is 0.

(2) Hereupon, the Gröbner basis can be obtained, since the device for generating the Gröbner bases comprises:

Gröbner basis checking means for computing the normalization format of the polynomial pair generated from the obtained polynomial set $F_1$;

Gröbner basis determination means for determining that $F_1$ is the Gröbner basis of F in the ideal equality checking which confirms that all elements of the polynomial set F are normalized to 0 by $F_1$; and recomputing control means for obtaining the polynomial set $F_1$ for the second time recovering the prime number p by the prime number selection means, when the determination by the Gröbner basis determination means is failed.

Hereupon, the Gröbner basis determination means determines that $F_1$ is the Gröbner basis of F, when "all elements of the S polynomial and F of the all polynomial pairs generated from the $F_1$ are normalized to 0 by $F_1$."

(3) In the above-mentioned (1), it is desirable that the second computing means computes the normalization on the rational number at once whenever it is determined that the normalization format in the modulus p obtained by the first computing means is not 0. In this case, it is more desirable that the device for generating the Gröbner bases is provided with a Gröbner basis candidate checking means for determining whether the head coefficient of the Gröbner basis candidate is divisible by the prime number p, and continuing the computation of the Gröbner basis candidate only when it is not divisible.

(4) Besides, the device for generating the Gröbner bases can be provided with homogenization means for homogenizing previously the polynomial F which will be an object and dehomogenization means for dehomogenizing the polynomial F which was obtained finally. Details about the homogenization will be mentioned in the latter part.

(5) By the way, in a conventional method for generating the Gröbner bases, a set D consisting of the all polynomial pairs constructed from an input polynomial set F is created first, and the Gröbner basis is computed by repeating from ① to ④ as follows:

① removing the element which is found to be normalized to 0 by a certain criterion without computing from D;

② outputting F when D is an empty set, taking out the element C from D by a certain strategy and regarding the rest as D again when D is not an empty set;

③ creating the S polynomial P from the polynomial pair C, normalizing it by F and describing the normalization of P as NF (P, F); and ④ adding all of the polynomial pairs consisting of each element of F and NF (P, F) to D, and adding NF (P, F) to F, when NF (P, F) is not 0. The method of the present invention further comprises the steps of:

a) selecting a prime number;

b) computing the normalization format of the polynomial pair regarding p as the modulus;

c) computing the normalization format on the rational number only when the normalization format in the modulus p is not 0;

d) omitting the computing of the normalization format on the rational number regarding the normalization format on the rational number as 0, when the normalization format in the modulus p is 0; and e) obtaining the polynomial set $F_1$ which is the Gröbner basis candidate.

Further, the Gröbner basis can be generated in relation to the polynomial set $F_1$ including the polynomial that is not limited to the Gröbner basis, checking that the $F_1$ is the Gröbner basis of F, when "all elements of the S polynomial and F of the all polynomial pairs generated from the $F_1$ are normalized to 0" in the $F_1$ by executing e-1) the Gröbner basis checking which computes the normalization format of the polynomial pair and e-2) the ideal equality checking which confirms that all elements of the polynomial set F are normalized to 0 in the $F_1$, and f) repeating e) after recovering p when the checking is failed. As a result, the volume of the memory which stores the intermediate formula is controlled to the little volume.

Hereupon, it is desirable that the step of (c) includes computing the normalization format of the polynomial pair regarding p as the modulus and computing the normalization format on the rational number at once whenever it is determined that the normalization format in the modulus p is not 0. It is desirable that the step further includes determining whether or not the head coefficient of the normalization format computed on the rational number is divisible by the prime number p after that, and continuing the computation of the Gröbner basis candidate only when it is not divisible.

Namely, in the present invention, the first computing A1 which computes the normalization format of the polynomial pair regarding p as the modulus is executed, and after that the corresponding second computing B1 which computes the normalization format on the rational number is executed at once. The computation result is processed like A1, B1, A2, B2, ... An, Bn. To put it concretely, the present invention determines whether or not the head coefficient of the normalization format computed on the rational number according to the first computing and the second computing is divisible by the prime number p and does the computing over recovering the prime number when it is divisible. Thus, the wasteful computing can be avoided and the memory usage can be reduced compared with the processing in which B1, B2, ... Bn is computed after A1, A2, ... An is computed completely.

Namely, in relation to the article, the fact that the pair which is normalized to 0 in the modulus p and is not normalized on the rational number exists also becomes clear in the checking step by the method of the present invention, but the remaining wasteful computation can be omitted, since the fact becomes clear at once in the step that t is computed when the head coefficient of the normalized polynomial is merely divisible by p.

Further, the step for homogenizing previously the polynomial set F which will be an object and the step for dehomogenizing the polynomial $F_1$ which was obtained finally can be provided.

Namely, the memory usage can be saved and the Gröbner basis can be obtained at a high speed, in relation to the example actually regarded as incomputable by adding the method what is called homogenization to the above means.

The homogenization itself is already known (T. Becker and V. Weispfenning, Gröbner Bases, GTM Springer-Verlag, 1993). The homogenization will be explained as follows.

In relation to the n variable polynomial($x_1, \ldots, x_n$) $\in R=K[x_1, \ldots, x_n]$ on the field K, the homogenization of f by the homogenization variable t, $f^* \in R_h = K[x_1, \ldots, x_n, t]$ will be defined as $f^*(x_1 \ldots, x_n, t) = t^{d_{max}} f(x_1/t, \ldots, x_n/t)$ (where, $d_{max}$ is the biggest degree of the degrees when $e_1 + \ldots + e_n$ is regarded as the all degrees of the term in relation to the all degrees of f, namely, each term of f, $X_1^{e_1} \ldots x_n^{e_n}$). By this operation, $f^*$ will be homogenous polynomial in which the all degrees of the all terms are equal to the all degrees of f. In relation to the homogenous polynomial g ($x_1, \ldots, x_n$, t), the dehomogenization $g^*$ related to t is defined by $g^* (x_1 \ldots, x_n) = g (x_1, \ldots, x_n, 1)$. Clearly, $(f^*)^* = f$ will be formed.

By the way, it is known that the computation of the Gröbner basis of the polynomial set only consisting of homogenous polynomials is proceeded smoothly by the normal strategy of Buchberger (the selection criteria that the polynomial pair whose order of the head term of S polynomial is smallest is selected when the polynomial pair to be normalized is selected). Accordingly, the operation in which each member of the input polynomial set is homogenized, the Gröbner basis is computed and the Gröbner basis is dehomogenized will be considered.

The following character is formed, even though the problem is the relationship between the Gröbner basis after the homogenization and the Gröbner basis of the original polynomial set.

PROPOSITION (H) HT (g)*=HT (g*)

The polynomial set which was obtained by dehomogenizing each member of the Gröbner basis after the homogenization will be the Gröbner basis of the original polynomial set, if (H) is formed in relation to the arbitrary homogenous polynomial g.

Namely, the term order in which (H) will be formed should be set up for the pair R, $R_h$.

1. In general case, $b_1 > b_2 \longleftrightarrow a_1 > a_2$ or ($a_1 = a_2$ and $s_1 > s_2$) should be defined in relation to $b_1 = a_1 t_1 s$, $b_2 = a_2 t_2 s \in R_h (a_1, a_2 \in R)$.

2. The order of $R_h$ should be the all degree lexicographical order regarding t as the order lowest, when the term order of R is the lexicographical order.

3. The order of $R_h$ should be the all degree inverse lexicographical order regarding t as the order lowest, when the order of R is the all degree inverse lexicographical order.

Then, the mutual normalization used in the present invention will be explained.

The mutual normalization means executing the operation in which one member of the polynomial set S is normalized by S−{f} to each element of S. The result will be uniform even if the operation is executed in any orders and it will be the same ideal Gröbner basis as the original polynomial set when S is the Gröbner basis, even though the operation entails the indetermination generally.

Usually, the operation in which the redundancy is eliminated should be executed before the mutual normalization is executed. In case of the present invention, the operation is also executed to the polynomial set which will be the Gröbner basis candidate to the last, even though the character that it is the Gröbner basis of the input polynomial set will never change even if the operation is executed to the polynomial set which has already become the Gröbner basis. The reasons are as follows.

It is meaningless to execute the checking against the ideal since the computation which was omitted in the modular computing will be repeated as it is, even though the candidate generates the same ideal as the input without fail before eliminating the redundancy.

It is expected that the time necessary for checking the Gröbner bases will be reduced drastically as the number of members and the terms whose order are big are reduced, even though there are some cases that the ideal generated by the obtained result will not be equal to the input ideal when the candidate is not the Gröbner basis, if the redundancy elimination and the mutual normalization are executed against the polynomial set which is not limited to the Gröbner bases.

The computer of the present invention executes the following algorithm for the Gröbner basis computing.

```
<Algorithm (2)>
Input: polynomial set F
Output: Gröbner basis G of the ideal generated by F
again:
(1)    p ← a prime number which does not divide the
       coefficient of the head term of each element of F
       and is not used.
(2)    regard φ as a mapping which makes the
       polynomial in which each coefficient is replaced
       with the remainder divided by p to the polynomial f
```

-continued

```
       G ← F
       G_p ← { φ (f) | f ∈ G }
       D ← { {f, g} | f, g ∈ G; f ≠ g }
       do {
(3)    remove the pair which is found to be normalized
       to 0 by a criterion from D
(4)    if D = 0 then go to check
       else {
           C ← one element selected from D by the
           criterion
           D ← D - {C}
       }
(5)    t_p = NF ( φ (P), G_p )
(6)    if t_p ≠ 0 then {
           t = NF (P, G)
(7)    if t ≠ 0 then {
           if p HC (t) then go to again
           D ← D ∪ { {f, t} | f G }
           G ← G ∪ {t}
           G_p ← G ∪ {φ (t)}
           }
       }
       }
       check:
(8)    remove the redundant bases regarding G as
       Gröbner basis
       normalize G mutually
(9)    D0 ← { {f, g} | f, g G ; f ≠ g }
       remove the pair which is found to be
       normalized to 0 by a criterion from D0
       create the S polynomial from each pair of D0,
       normalize it by G and go to again if it is not
       0
(10)   normalize each element of F by G and go to
       again if it is not 0
(11)   return G
```

In the present invention, as shown in the fifth term of Algorithm (2), the computation of the normalization format regarding the prime number p as a modulus is executed before the computation of the normalization format on the rational number is executed. However, unlike a traditional method for computation, the computation is only used for judging whether the normalization format regarding the rational number p as a modulus is 0 or not, and the value itself will be discarded if it is not 0, then the normalization format on the rational number will be computed again.

On the other hand, the computation is omitted regarding the value of the normalization format to be computed and checked essentially on the rational number as 0, when the value is 0. The termination is guaranteed in theory, since it is understood that the correct result is obtained without fail if the prime number which does not divide a denominator nor a numerator of the coefficient appearing on the all intermediate formulas of the computation on the rational number is selected. However, the frequency that the invalid p appears on the intermediate formulas comes into question, since the prime number of four digits or so are actually selected as p.

Accordingly, the efficiency of the present invention except the checking parts of the validity of the result in the last step mentioned later depends upon which of the following two positive and negative factors is an important part:

executing the computation of the normalization regarding p as the modulus at all times; or being able to omit the computation that is normalized to 0 on the rational number, and the frequency that the normalization format is misjudged as 0 by the computation of the modulus p in spite of the fact that the normalization format on the rational number is not 0. The addition, substraction, multiplication and division of the integral numbers appearing on the normalization computation in the modulus p can be accelerated by selecting the prime number p from the numbers of the size within the integral number computing provided by a digital processor, and the time necessary for the computation of the normalization in the modulus p dwindles relatively as the scale of a problem is getting bigger, even though the former comparison varies depending on the problems and the general argument is inexecutable. Besides, sometimes it happens that the intermediate formula expansion is so terrible that the memory capacity limit of the computer is surpassed in the midst of the computing normalized to 0 on the rational number. However, there are also many cases that the Gröbner basis of the result does not get so big, and the judgement of 0 by the modulus p demonstrates the greatest effect in such case.

Besides, in reference to the latter, namely, the frequency that the normalization format is misjudged as 0 by the computation of the modulus p in spite of the fact that the normalization format on the rational number is not 0, it is understood that the correct result is obtained by one trial in almost all of the problems if the prime number of four digits or so is used, as a result of trying the test problems of the Gröbner basis computation, even though it does not rise higher than the guess by the experiment to the last.

The followings can be considered as the foundations. In the algorithm, it is demanded that the head coefficient of the formalization format computed on the rational number is not 0 in the modulus p. This guarantees the fact that all of the coefficients of the normalization on the rational number are divisible by p, if the normalization modulo p becomes 0. Accordingly, it is expected that the probability that all of the coefficients of the normalization on the rational number are divisible by p will be extremely small if the p is big.

Then, the checking of the validity of the result in the last step will be explained. The checking comprises the following two steps.

1. checking that it is the Gröbner basis (the tenth term of Algorithm (1))
2. checking the equality of the input ideal and the output ideal(the eleventh term of Algorithm (1))

The former is executed multiplying the usual Gröbner basis computation algorithm indicated in Algorithm (2) by the obtained polynomial set G again. Hereupon, all of the polynomial pairs constructed from G will be normalized to 0 by G, if G is the Gröbner basis.

However, the effect of the modular computation will be dissolved if it is decided that the normalization on the rational number omitted in the previous step is executed hereupon, since the computation is executed on the rational number wholly. However, in reality, the number of the polynomial pairs to be normalized actually is small compared with the number of the polynomial pairs in the previous step, since the redundancy is removed in the eighth term, and it does not take much time to normalize a polynomial pair since the mutual normalization is also executed.

Further, in reference to the checking of the equality of the latter ideal, G is indicated as the Gröbner basis by the ninth term, and G is the partial ideal of the ideals generated by the input polynomial set F out of the method for construction at this point. Accordingly, the fact that each element of the input polynomial set is normalized to 0 by G will be necessary and sufficient condition for the ideal equality. In general, there are many cases that F is not so large, and the time necessary for the checking is a small proportion compared with the time necessary for the computation that has been already executed, even though the checking is also the computation of the normalization on the rational number.

Consequently, the size of the memory which reserves the intermediate formula can be kept small.

The case that the method what is called homogenization is added to the above means will be explained. The homogenization means homogenizing the degree of each term of the equation. For instance, assume that the equation, $f(x, y)=2x^2y+xy+X+1$ exists. In $2x^2y$, the degree of 2 is 0, the degree of $x^2$ is 2, the degree of y is 1, so the degree of $2x^2y$ is 2+1=3, when the degree of the each term is looked up. Similarly, the degree of xy is 2, the degree of x is 1 and the degree of 1 is 0.

The new variable t will be introduced to homogenize each degree of the terms of the equation.

All of the degrees of each term will be 3, if it is assumed that $f(x, y, t)=2x^2y+xyt+xt^2+1t^3$.

As mentioned hereinbefore, if the Gröbner basis of the present invention is obtained after homogenizing the degrees and t=1 is substituted in the obtained solution, the Gröbner basis for the input polynomial set will be obtained.

Generally, in the Gröbner basis computation, the computation efficiency is influenced greatly by the method for selecting the polynomial pair selected in the midst of the computation, and the memory usage is increased accordingly. The time necessary for computing the normalization which is not 0 will be increased, the memory will be filled up and the computation will become inexecutable in the worst case, if the method for selecting the polynomial pair is not appropriate. Accordingly, the greatest computation efficiency can be accomplished by the standard method for selecting the polynomial pair if it is assumed that the homogeneous polynomial is an object of the Gröbner basis computation.

However, the problem that the unnecessary pairs are increased rapidly by the homogenization exists as a defect of the homogenization. Especially, in many cases, the normalization of the unnecessary pairs appearing due to the homogenization needs the computing of more lengthy integral number as it remains longer, so the effect obtained by the homogenization is often negated.

Accordingly, in the present invention, a method for generating the Gröbner bases and the device which dissolve the defect of the homogenization using the homogenization and improve the use efficiency of the memory are provided.

Generally, the computation of the Gröbner basis using the homogenization is executed as follows.

First of all, create the polynomial set $F_h$ by homogenizing each polynomial of the input polynomial set F as mentioned hereinbefore. Then compute the Gröbner basis $G_h$ of $F_h$. Then dehomogenize the $G_h$ and regard the mutually normalized $G_h$ as G if necessary. The G will be the Gröbner basis.

Hereupon, the term order used for computing the Gröbner basis of $F_h$ can be determined by the term order for F. The increase of the computation time, namely, the increase of the memory usage due to the increase of the unnecessary pairs can be controlled by applying the modular computing of the present invention to the Gröbner basis computation, even though the unnecessary pairs occurring in the computation of the Gröbner basis causes a bad influence on the whole computation efficiency and the use efficiency of the memory as mentioned hereinbefore. However, almost all of the normalization of the unnecessary pairs omitted by the modular computing should be executed when the Gröbner basis of the latter parts of the modular computing method is checked, since the number of the bases of $G_h$ becomes very huge even if the eliminating operation for the redundancy is executed by the homogenization of $F_h$, and executing the elimination of the unnecessary pairs in accordance with "selection criteria of the unnecessary pairs" is not so effective, when an attempt to compute the Gröbner basis of the $F_h$ itself is made.

However, it is possible to make the maximum use of the effect of the homogenization and the modular computing avoiding such problems, minimize the memory usage and plan the effective use of the resources by the following method.

Homogenization+modular computing method

1. Create the polynomial set $F_h$ by homogenizing each polynomial of the input polynomial set F.

2. Select the prime number p again and compute the Gröbner basis candidate $G'_h$ of $F_h$ by the modular computing method.

Namely, the homogenization+the modular computing method which creates a set D consisting of the all polynomial pairs constructed from an input polynomial set F, the method comprising:

① removing the element which is found to be normalized to 0 by a certain criterion without computing from D;

② outputting F when D is an empty set, taking out the element C from D by a certain strategy and regarding the rest as D again when D is not an empty set;

③ creating the S polynomial P from the polynomial pair C, normalizing it by F and describing the normalization of P as NF (P, F); and ④ adding all of the polynomial pairs consisting of each element of F and NF (P, F) to D, and adding NF (P, F) to F when NF (P, F) is not 0, comprising the steps executed by the method in a computer which indicates the simultaneous equations in relation to a model in which the restrictions among the parameters are given by the simultaneous algebraic equations and executes the Buchberger computing that generates the Gröbner bases from a polynomial set F described in a memory, repeating from ① to ④, of:

a) selecting a prime number;

b) computing the normalization format of the polynomial pair regarding p as the modulus;

c) computing the normalization format on the rational number only when the normalization format in the modulus p is not 0;

d) omitting the computation of the normalization format on the rational number regarding the normalization format on the rational number as 0, when the normalization format in the modulus p is 0; and e) obtaining the polynomial set $G'_h$ which is the Gröbner basis candidate. Then, 3. Dehomogenize $G'_h$ and regard the mutually homogenized $G'_h$ as G'.

4. Execute the Gröbner basis checking to G'.

5. Regard G' as the Gröbner basis of F if the checking is passed, return to the above 2, execute the selecting of the prime number p again and repeat the above operation after that, if the checking is not passed.

Hereupon, a characteristic feature of executing the dehomogenization between the Gröbner basis candidate generating by the modular computing method and the Gröbner basis checking is constituted.

The number of the bases of $G'_h$ which are the Gröbner basis candidates of the homogenization $F_h$ is large, and a large number of normalization computations have to be executed by the Gröbner basis checking in relation to $G'_h$. However, the Gröbner basis checking of $G'_h$ should be omitted and the Gröbner basis candidate should be obtained from the dehomogenization of $G'_h$ directly, since the Gröbner basis of F is what you would like to obtain finally and there is no need to obtain the Gröbner basis of $F_h$. The dehomogenization of $G'_h$ brings on the following effects.

1. A lot of bases become redundant when the $G'_h$ is dehomogenized, and these redundant bases will be removed and the number of members of G' will be decreased considerably compared with $G'_h$.

2. It is expected that the normalization of the unnecessary pairs necessary for the Gröbner basis checking will be decreased considerably compared with the case in $G'_h$, since G' is dehomogenized. Accordingly, <the homogenization+ the modular computing> makes it possible to generate the Gröbner bases securely and at a high speed in relation to the example that the computation becomes inexecutable by the inappropriate selection of the normalization pairs.

The present invention can be used for the problems relating to optimization of the system, the problems relating to the machine design, the inverse kinematical computation of the robot, and the solution of the partial differential equation, and for generating what is called a blending surface which connects an object to an object smoothly when the three dimensional model is created in CAD and the computer graphics.

BRIEF DESCRIPTION OF THE DRAWINGS

FIG. 2 diagram indicating a representation of a natural number on the memory;

FIG. 3 is a diagram indicating a representation of a rational number on the memory;

FIG. 4 is a diagram indicating a representation of a term on the memory;

FIG. 5 is a diagram indicating a representation of a polynomial on the memory;

DESCRIPTION OF THE PREFERRED EMBODIMENTS

The embodiments of the present invention will be explained as follows.

<Embodiment 1>

Figure 1:
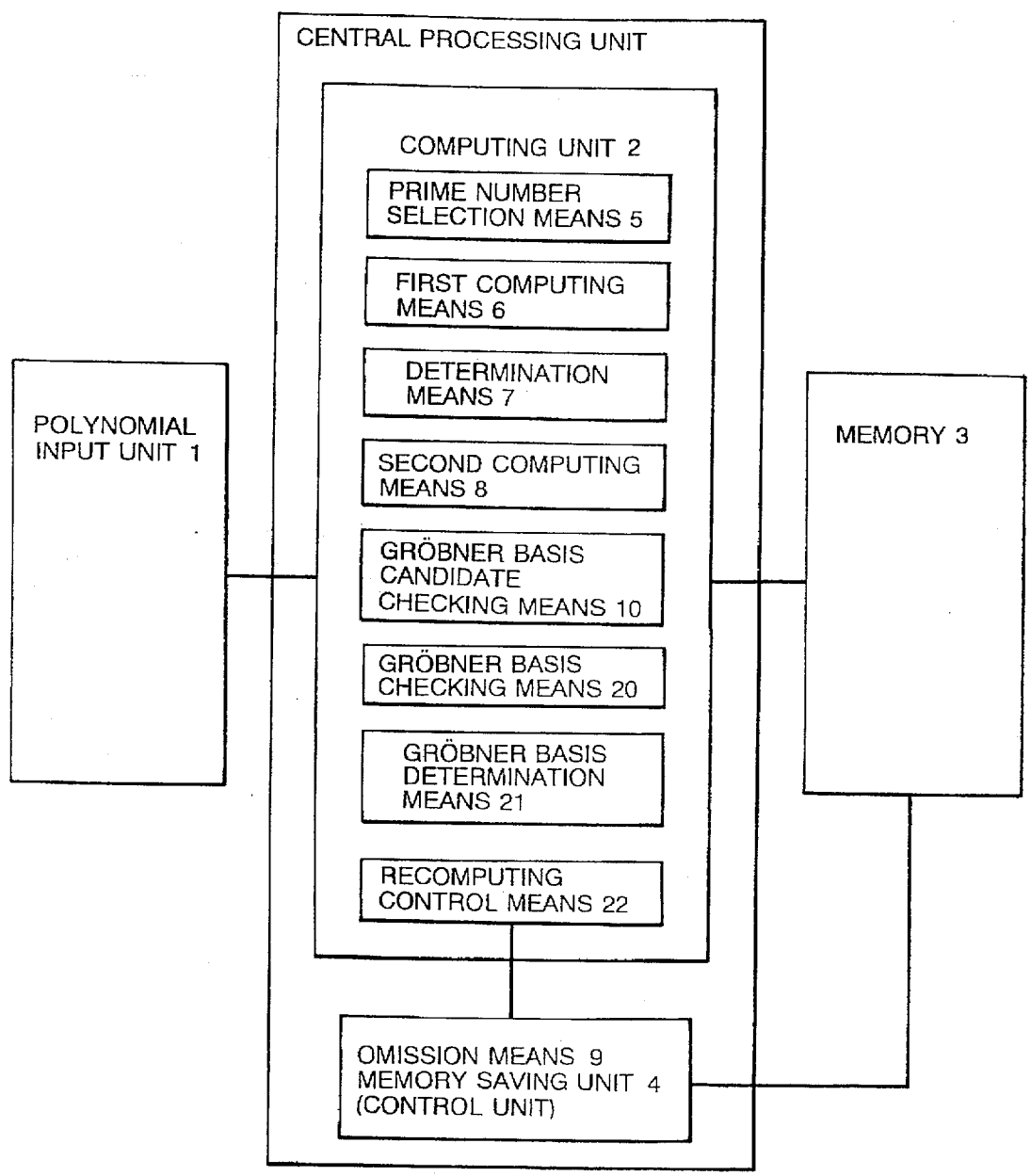
FIG. 1 is a concept block diagram of the present invention.

As shown in FIG. 1, a computer concerned in the present invention comprises a polynomial input unit 1 which inputs a polynomial, a computing unit 2 which executes a computing for the input polynomial, a memory 3 which stores an intermediate computing result and a last result of the computing unit, and a memory saving unit 4 which controls the memory capacity. Further, the computing unit and the memory saving unit are integral units realized on the central processing unit of a computer by a program that executes the algorithm 2, and they do not exist physically. Accordingly, a prime number selection means 5 for selecting a prime number p, a first computing means 6 for computing a normalization format of the polynomial pair regarding p as a modulus, a determination means 7 for determining whether the normalization format in the modulus p is 0 or not, a second computing means 8 for computing the normalization format on a rational number when it is determined by the determination means that the normalization format in the modulus p is not 0, an omission means 9 for omitting the computation of the normalization format on the rational number regarding the normalization format on the rational number as 0, when it is determined by the determination means that the normalization format in the modulus p is 0, a Gröbner basis candidate checking means 10 for determining whether a head coefficient of a Gröbner basis candidate is divisible by the prime number p and continuing the computation of the Gröbner basis candidate only when it is not divisible, a Gröbner basis checking means 20 for computing the normalization format of the polynomial pair generated from the obtained polynomial set $F_1$, a Gröbner basis determination means 21 for determining that the $F_1$ is the Gröbner basis of F, when all elements of the S polynomial and F of the all polynomial pairs generated from the $F_1$ are normalized to 0 by the $F_1$ by the ideal equality checking which confirms that all elements of the polynomial set F are normalized to 0 by the $F_1$ and a recomputing control means 22 for obtaining the polynomial set $F_1$ for the second time recovering the prime number p by the prime number selection means, when the determination by the Gröbner basis determination means is failed are realized on the central processing unit.

Further, as shown in FIG. 2–FIG. 7, all kinds of data structures are constructed on the memory. The mechanical capacity of the memory itself can be saved and the computing speed will be accelerated, if the volume stored to the memory is saved.

As shown in FIG. 2–FIG. 7, a structure indicated by the square indicates a continuous area on the memory, namely, an array. $a_1 \rightarrow R$ indicates that $a_1$ is a pointer indicating a head of the area R.

Figure 6:
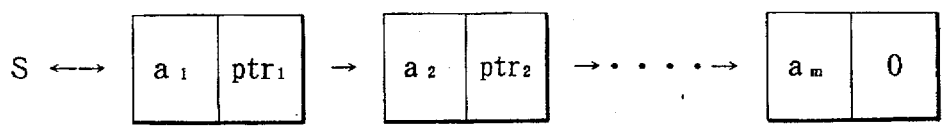
FIG. 6 is a representation of the set $S=\{a_1, \ldots a_m\}$ on the memory by the list.
Figure 7:
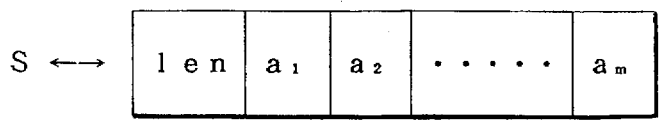
FIG. 7 is a representation of the set $S=\{a_1, \ldots a_m\}$ on the memory by the array.

FIG. 2 indicates a natural number. FIG. 3 indicates a rational number. FIG. 4 indicates a term. FIG. 5 indicates a polynomial. FIG. 6 and FIG. 7 are the representation of the set $S=\{a_1, \ldots a_m\}$ on the memory. The set can be represented on the computer as the set which ignored the order in a list and the array.

The longer the array in FIG. 2–FIG. 7 is, namely, the bigger the managed number is, the more capacity of the memory is needed.

The necessary volume of the memory can be saved by the present invention. This will be proved as follows.

First of all, the flowchart of the embodiment will be explained in accordance with FIG. 8 and FIG. 9.

Figure 8:
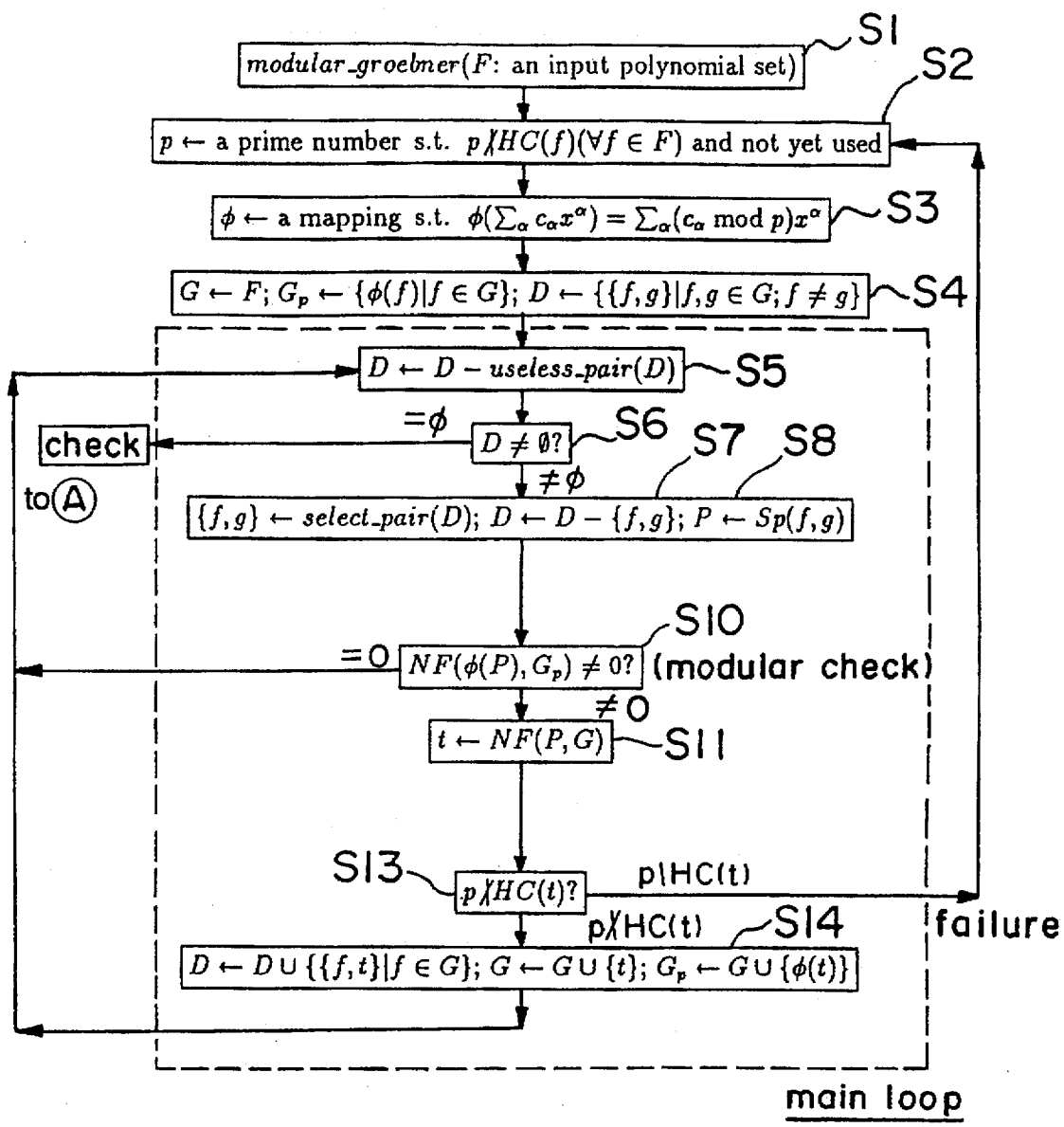
FIG. 8 is a diagram indicating a flowchart 1 of the present invention.

Firstly, as shown in FIG. 8, the input polynomial set F is input from the polynomial input unit (S 1). Then select the prime number p which does not divide the coefficient of the head term of each element of the input polynomial set F and is not used (S 2). Then define the mapping ø as the mapping that makes the polynomial in which each coefficient of f was replaced with the remainder divided by p correspond to the polynomial f (S 3).

Then initialize G to F, regard $G_p$ as the set of images according to ø of each element of G, create a set D consisting of all polynomial pairs constructed from G (S 4), and repeat the following loops from S5 to S 14 after that.

Secondly, remove the element which is found to be normalized to 0 by a criterion without computing from D (S 5).

Determine whether D is an empty set or not (S 6), and pass through the loop and go to S 21 if D is an empty set. Take out an element C from D by a criterion, regard the rest as D again, and create a S polynomial P from the polynomial pair C (S 8) if D is not an empty set(S7).

Then compute the normalization format NF (ø (P), $G_p$) by $G_p$ of ø (P) regarding p as the modulus, and determine whether NF (ø (P), $G_p$) is 0 or not (S 10). Then compute NF (P, G) only when F (ø (P), $G_p$) is not 0. Return to S 5 when NF (ø (P), $G_p$) is 0.

Return to S 2 if HC (NF (P, G)) is divisible by p (S 13). Otherwise, add each element of G and all of the polynomial pairs consisting of NF (P, G) to D. Check whether it is suitable as the Gröbner basis candidate. Further, add NF (P, G) to G and add ø (NF(P, G)) to Gp. Return to S 5 after that.

Hereupon, in S 13, determine whether the head coefficient of the normalization format computed on the rational number is divisible by p or not, and compute the normalization format again recovering p if it is not divisible, even though there are some possibilities that the case in which the normalization format on the rational number is misjudged as 0 by the computation of the modulus p in spite of the fact that it is not 0 can not be checked by the flowchart, and it will be output as a Gröbner basis candidate. This guarantees that all coefficients of the normalization format on the rational number will be divisible by the modulus p, if the normalization format on the rational number becomes 0 in the modulus p in spite of the fact that it is not 0. The probability that all coefficients of the normalization format on the rational number are divisible by p will be essentially 0 when the p is large. This indicates that the above-mentioned possibility is essentially 0.

Output G assuming that the probability that G is the Gröbner basis is high and store it in the memory when D is an empty set in S 6. This is the Gröbner basis candidate G.

Figure 9:
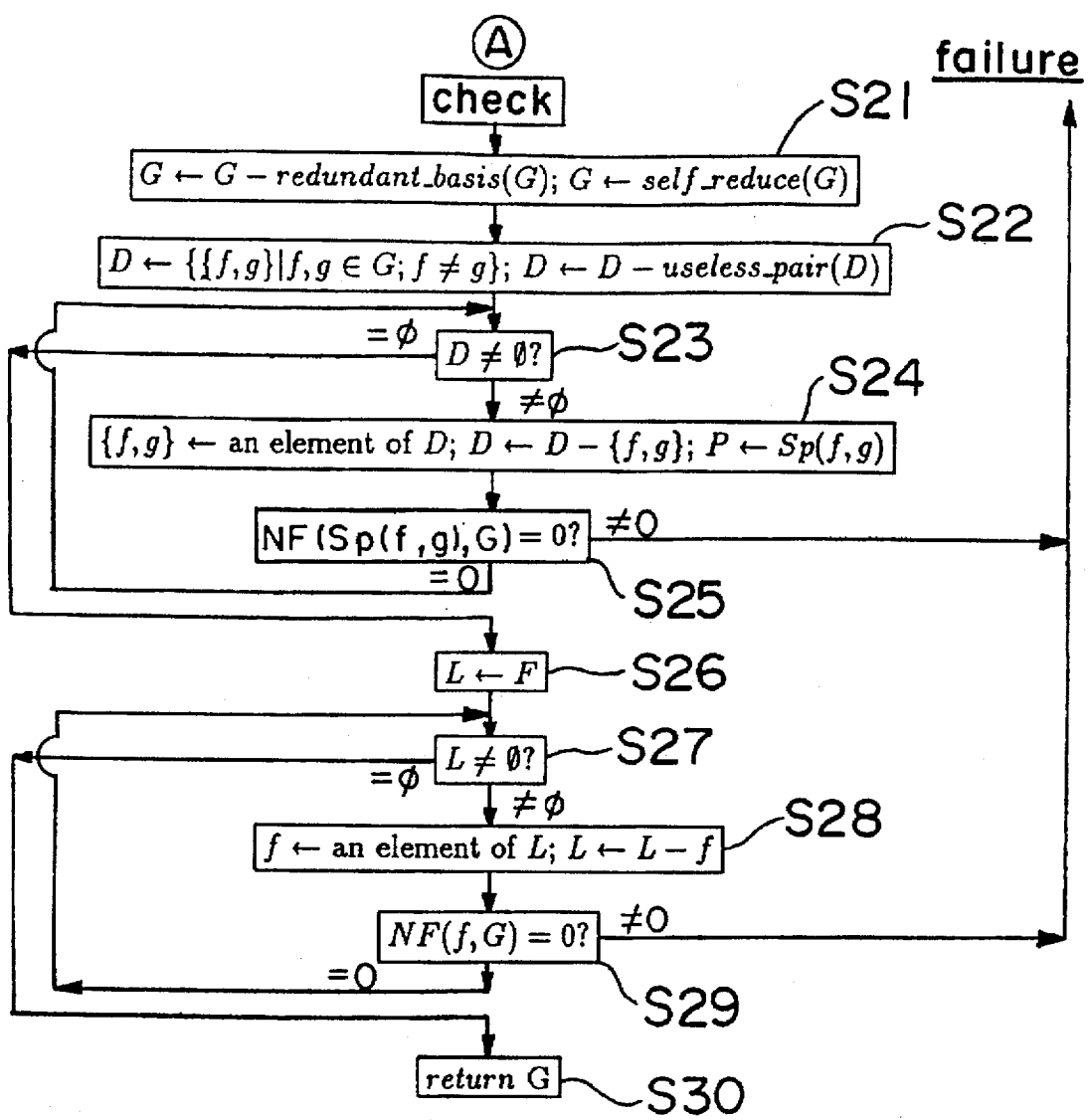
FIG. 9 is a diagram indicating a flowchart 2 of the present invention.

In FIG. 9, regard G which was obtained as a result of the processing of FIG. 8 as the Gröbner basis, remove the redundant basis and regard the basis which was mutually normalized as G again (S 21).

Then, create a S polynomial from the polynomial pairs generated from G, except from the polynomial pairs found to be normalized 0 by the criterion, compute the normalization format by G and return to S 2 when the polynomial pair which is not normalized to 0 comes out (S 22–S 25).

Besides, compute the normalization format by G of each element of F, and return to S2 when the polynomial pair which is not normalized to 0 comes out (S 26–S 29).

Output G at the end (S 30).

In FIG. 8 and FIG. 9, S 10 is the checking of the normalization to 0 by the modular computing, S 22–S 25 are the checking that it is the Gröbner basis, and S 26–S 29 are the checking of the equality of the input ideal and the output ideal.

The computation of a simplification and the computation of a normalized form within this flowchart will be explained. First of all, the computation of the simplification will be explained.

One order based on the degree is established among the each term of the polynomials before the Gröbner basis computation is started. Then, each term of the all polynomials appearing in the midst of the computing is aligned from top to bottom in accordance with the order.

$$f = c_1 \cdot t_1 + \ldots + c_1 \cdot t_1$$

$t_1$ is a leading term, namely, a head term. The simplification means that an operation in which the formula is regarded as 0 and $t_1$ is replaced with $-1/c_1 \cdot (c_2 \cdot t_2 + \ldots + c_1 \cdot t)$ is executed to one polynomial. Hereupon, the replacement can only be executed to the terms divisible by $t_1$. Namely, g can be simplified by f when it is $t_1|sk$ in relation to $$g = d_1 \cdot s_1 + d_2 \cdot s_2 + \ldots d_k \cdot s_k + \ldots d_l \cdot s_l.$$ In this case, g after the simplification will be $$g - (dk/c_1) \cdot (s_k/t_1) \cdot f.$$

Although the rational number computing among the coefficients appears hereupon, in reality, the appearance of the rational number computing should be avoided by the simplification of $$c_1 \cdot g - d_k \cdot (s_k/t_1) \cdot f$$

since the rational number computing should compute a lot of greatest common divisors and damages the efficiency remarkably. By these actions, the simplification result will be the constant multiple of the result defined previously, but in reality, the difference among the constant multiples will not influence, since the result is regarded as the obtained formula which is normalized to 0.

Then the computation of the normalized form will be explained.

The computation of the normalized form (NF (f, G)) is obtained by executing the simplification of the foregoing paragraph until the simplification by the head term of any element of G becomes inexecutable. It is guaranteed that the operation will be stopped in a limited time without relying on the method for selecting the element of G when the simplification is executed. However, the result is not generally unique depending on the method for simplification.

The multiple-length numerals (bignum) of the optional digits are used as a coefficient instead of a floating decimal used in the usual numerical computation for the following reasons.

The obtained Gröbner basis is in a form that a numerical solution is easily obtained. Besides, an error of the numerical solution can be estimated clearly. In many cases, the accuracy of the obtained result will be unknown if the simultaneous equations are solved by using the floating decimal from the beginning.

A formula transformation is executed under a condition that a mathematical character of the equation is preserved. In case of the numerical value computation, the mere numerical value is obtained as a result.

The case that a solution does not include a limited number of parameters but some parameters is also manageable. In such a case, the numerical value computation is powerless from the beginning.

The well-known test problems of the Gröbner basis computation in accordance with the flowcharts of FIG. 8 and FIG. 9 are shown below.

---

Katsura5=[$u_o + 2u_1 + 2u_2 + 2u_3 + 2u_4 + 2u_5 - 1$,
$2u_4u_0 + (2u_3 + 2u_5)u_1 + u^2_2 - u_4$,
$2u_3u_0 + (2u_2 + 2u_4)u_1 + 2u_5u_2 - u_3$,
$2u_2u_0 + u^2_1 + 2u_3u_1 + (2u_4 - 1)u_2 + 2u_5u_3$,
$2u_1u_0 + (2u_2 - 1)u_1 + 2u_3u_2 + 2u_4u_3 + 2u_5u_4$,
$u^2_0 - u_0 + 2u^2_1 + 2u^2_2 + 2u^2_3 + 2u^2_4 + 2u^2_5$]
order:$u_5 > u_4 > u_3 > u_2 > u_1 > u_0$
Katsura6=[$u_0 + 2u_1 + 2u_2 + 2u_3 + 2u_4 + 2u_5 + 2u_6 - 1$,
$2u_5u_0 + (2u_4 + 2u_6)u_1 + 2u_3u_2 - u_5$,
$2u_4u_0 + (2u_3 + 2u_5)u_1 + u^2_2 + 2u_6u_2 - u_4$,
$2u_3u_0 + (2u_2 + 2u_4)u_1 + 2u_5u_2 + (2u_6 - 1)u_3$,
$2u_2u_0 + u^2_1 + 2u_3u_1 + (2u_4 - 1)u_2 + 2u_5u_3 + 2u_6u_4$,
$2u_1u_0 + (2u_2 - 1)u_1 + 2u_3u_2 + 2u_4u_3 + 2u_5u_4 + 2u_6u_5$,
$u^2_0 - u_0 + 2u^2_1 + 2u^2_2 + 2u^2_3 + 2u^2_4 + 2u^2_5 + 2u^2_6$]
order:$u_6 > u_5 > u_4 > u_3 > u_2 > u_1 > u_0$
Cyclic6=[$c_5c_4c_3c_2c_1c_0 - 1$,
$((((c_4+c_5)c_3+c_5c_4)c_2+c_5c_4c_3)c_1+c_5c_4c_3c_2)c_0+c_5c_4c_3c_2c_1$,
$(((c_3+c_5)c_2+c_5c_4)c_1+c_5c_4c_3)c_0+c_4c_3c_2c_1+c_5c_4c_3c_2$,
$((c_2+c_5)c_1+c_5c_4)c_0+c_3c_2c_1+c_4c_3c_2+c_5c_4c_3$,
$(c_1+c_5)c_0+c_2c_1+c_3c_2+c_4c_3+c_5c_4$,
$c_0+c_1+c_2+c_3+c_4+c_5$]
order: $c_0 > c_1 > c_2 > c_3 > c_4 > c_5$
Lazard=[ $cba^2 + (cb^2 + (c_2+c+1)b+c)a+cb$,
$(cb^2+cb)a^2+(c^2b^2+cb+1)a+cb+c$,
$(c^2+c)b^2a^2+(cb^2+cb+c)a+c+1$]
order:$a > b > c$
Arnborg=[ $a+b+c+d+e$,
$(b+e)a+cb+dc+ed$,
$((c+e)b+ed)a+dcb+edc$,
$((ec+ed)b+edc)a+(e+1)dcb$,
$edcba-1$]
order:$a > b > c > d > e$

---

In Table 1, the computation result of the each problem by the usual algorithm is compared with the computation result by the algorithm adopting the improvements of the present invention.

Hereupon, the computation program was implemented on the mathematical expression processing system Risa/Asir the inventors has been developing. The computer, Sony NEWS5000 (R4000 CPU, 50 MHz).was used. Either example is the example that the computation is inexecutable in a conventional mathematical expression processing system, or the extremely huge computation time is needed, since the big coefficient expansion of the intermediate formula occurs in the midst of the computation. As illustrated in Table 1, the improvements of the present invention demonstrates a remarkable effect to the problems mentioned hereupon.

TABLE 1

| | preimprovement | | postimprovement | | | | | | |
|---|---|---|---|---|---|---|---|---|---|
| No | Total | NF/Q | Total | NF/Q | NF/p | GB | Member | ratio | option |
| 1 | 400 | 357 | 79 | 10 | 4.3 | 0.01 | 23 | 5.1 | lex |
| 2 | — | — | 11580 | 1426 | 2075 | 0.01 | 1964 | — | lex,homo |
| 3 | 82 | 50 | 39 | 5.9 | 11 | 7.5 | 0.21 | 2.1 | levlex homo |
| 4 | 389 | 356 | 102 | 9.7 | 53 | 5.3 | 1 | 3.8 | lex,homo |
| 5 | 90 | 86 | 14 | 3.3 | 1 | 0 | 5.9 | 6.4 | lex |
| 6 | — | — | 488 | 26 | 260 | 33 | 45 | — | lex,homo |

Hereupon, No. 1 indicates the experimental example of Katsura 5, No. 2 indicates the experimental example of Katsura 6, No. 3 indicates the experimental example of Cyclic 6, No. 4 indicates the experimental example of Cyclic 6, No. 5 indicates the experimental example of Lazard, No. 6 indicates the example of Arnborg.

"Total" indicates the all CPU time, "NF/Q" indicates the CPU time for the normalization on the rational number, "GB" indicates the CPU time for the Gröbner basis checking (the step 10 of Algorithm (1)), and "Member" indicates the CPU time for the ideal equality checking (the step 11 of Algorithm (1)). All of the units are second.

The "ratio" is <"Total" before the improvements>/<"Total" after the improvements> and indicates the speed-up by the improvements. The computation is started adopting 1009 as the modulus p in each computation. Then the correct Gröbner basis was obtained by the modulus in every example. In "option", "lex" indicates the lexicographical order, "revlex" indicates the all degree inverse lexicographical orders and "homo" indicates that the Gröbner basis was obtained through the homogenization. Besides, the blank spaces indicate that the computation was interrupted since it was supposed in the midst of the computation that it would take an excessive time for the computation compared with the computation after the improvements.

Besides, the result of Table 1 would be like the following Table 2 when compared with the result of January in 1993.

TABLE 2

| No | Jan., 1993 | pre-improvement Total | post-improvement Total | ratio |
|---|---|---|---|---|
| 1 | 2261.3 | 400 | 79 | 5.1 |
| 2 | — | — | 11580 | — |
| 3 | 5017* | 82 | 39 | 2.1 |
| 4 | 861 | 389 | 102 | 3.8 |
| 5 | — | 90 | 14 | 6.4 |
| 6 | — | — | 488 | — |

The figure in No. 2 is supposed to be equal or more than two.
The figure of No. 6 is supposed to be equal or more than two.
*indicates that the value is without homogenization As shown hereinbefore, the CPU speed has been further improved since January in 1993. This is supposed to have occurred as a result of the fact that the memory saving by the present invention was executed efficiently.

The following things can be induced with examination about the memory usage state.

The present improvement can reduce necessary memory, as well as the CPU time. The sum total of the memory demanded by the program to the system is reduced without fail as shown in Table 3, even though the absolute volume of the actually necessary memory is not always reduced to a large extent, since the unnecessary memory is collected by a garbage collector.

TABLE 3

|  | Katsura5 | cyclic6 revlex | cyclic6 lex | lazard |
|---|---|---|---|---|
| preimprovement | 404 | 240 | 1616 | 148 |
| postimprovement | 104 | 136 | 364 | 40 |

Unit: MB

Similarly to the comparison of the time, a comparison is not executed in relation to "Katsura 6" and "Arnborg", since the computation in the version before the improvement is substantially inexecutable. In relation to "Arnborg", the tolerance of the counter (32 bits) was surpassed when the computing was interrupted in a few hours. It is suspected that more memory of at least one more figure was needed at that point of time.

Figure 10:
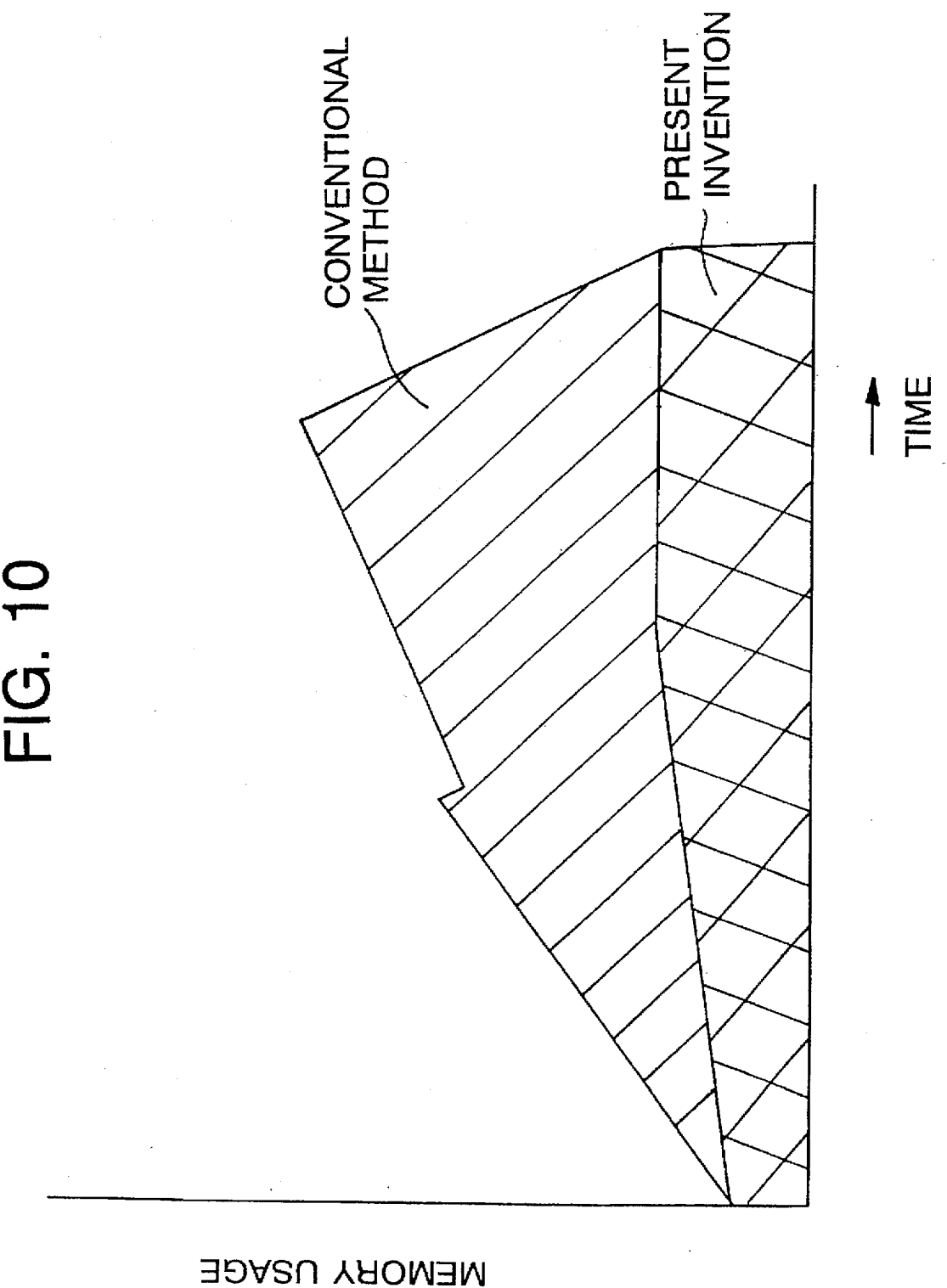
FIG. 10 is a diagram indicating a deterioration with age of the memory usage in old and new.

As shown in FIG. 10, in the present invention, the memory usage can be kept small even if it is deteriorated with age. In a conventional method, it is hard to predict the peak and the effective utilization of the memory resource can not be arranged, since the usage of the memory is increased suddenly in the midst of the computation compared with the memory volume necessary for representing the result.

As explained hereinbefore, the present invention can generate a Gröbner basis at a high speed and makes a great contribution to the high-speed-solution of the algebraic equation compared with the existing method, since the coefficient expansion can be avoided by the modular computation and the validity of the result can be easily confirmed, in relation to the problem that a large coefficient expansion occurs when the S polynomial which is normalized to 0 is normalized on the rational number.

Further, a valid and practical method for generating the Gröbner basis which can lower the computation cost to a large extent by using the modular computing, and can make it easy to confirm the validity of the result that has been difficult to confirm up to the present invention can be provided.

<Embodiment 2>

Figure 11:
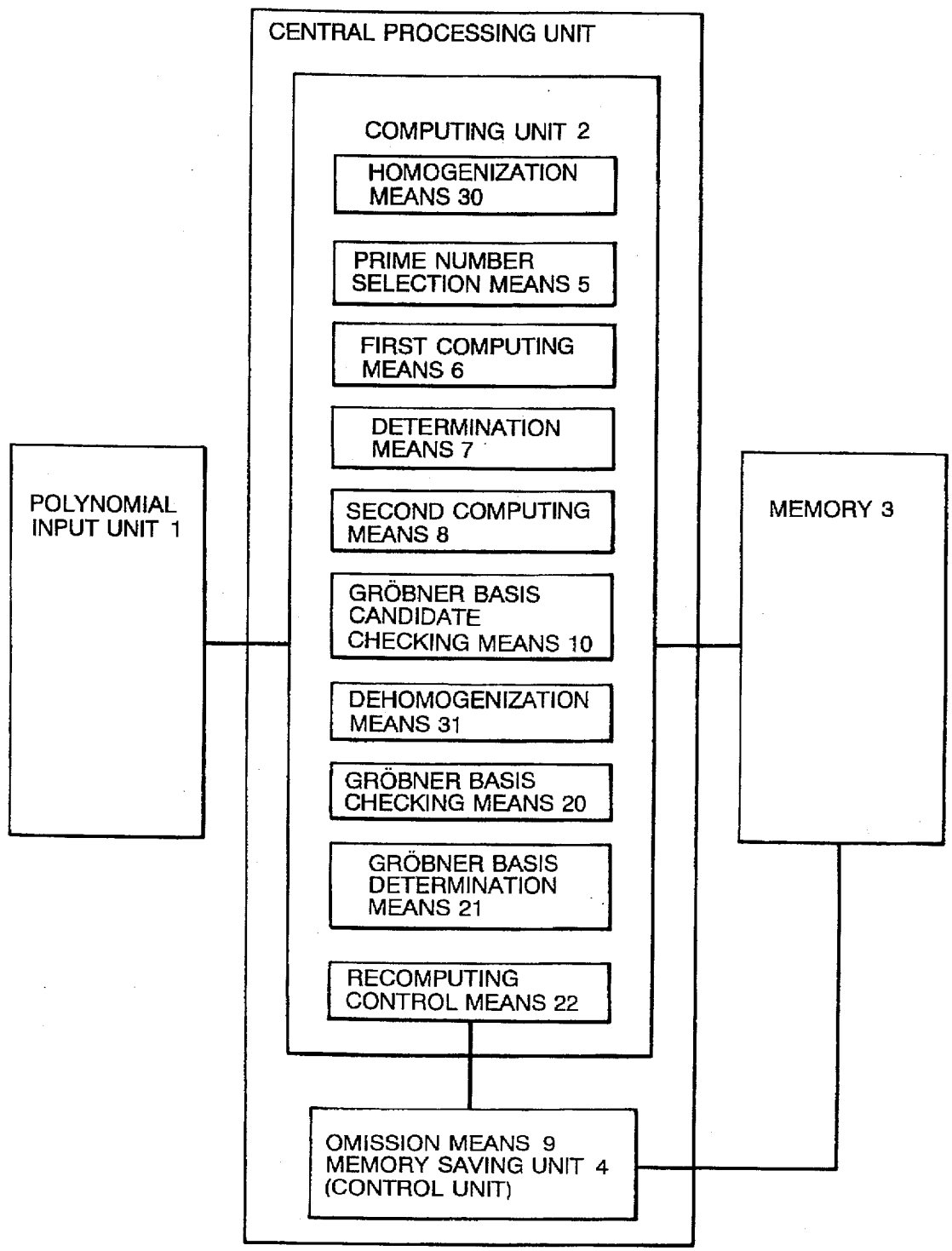
FIG. 11 is a concept block diagram indicating an embodiment 2.

The embodiment 2 is the example of the case that the homogenization is combined with the modular computing of the present invention. As shown in FIG. 11, the embodiment 2 is provided with a homogenization means 30 for homogenizing previously the polynomial set F which will be an object of the computing and a dehomogenization means 31 for dehomogenizing the polynomial set $F_1$ which was obtained finally, and the rest is the same as the embodiment 1.

In FIG. 4, the example of the case that the homogenization is combined with the modular computing is shown, comparing with the case that the homogenization is not executed and the case that the modular computation is not executed.

TABLE 4

| eq. | option | modular-computing | demodular-computing | ratio |
|---|---|---|---|---|
| $A_6$ | LH | 127 | 903 | 7.1 |
| $A_7$ | RH | 54252 | — | >7 |
| $MA_7$ | LH | 4.47 | 7.7 | 1.7 |
| $MA_5$ | LH | 451 | 55248 | 123 |
| $K_5$ | L | 1152 | 2060 | 1.8 |
| $K_5$ | LH | 113 | 8695 | 77 |
| $K_6$ | LH | 10364 | — | >25 |
| $K_7$ | LH | two weeks | — | — |
| Rose | LH | 43.4 | 269 | 6.2 |

The computer, Sony NEWS 5000 (R4000 CPU, 50 MHz) was used.

The equation used for Table 4 is shown below. In the following equation, "$A_n$" indicates a n variable "Arnborg system" and a variable order is an alphabetic order from $A_5$ to $MA_5$.

$A_5$   {edcba−1,( ( ( d+e )c+ed )b+edc )a+edcb, ( ( c+e )b+ed )a
+dcb+edc, ( b+e )a+cb+dc+ed,a+b+c+d+e}

$A_6$   {fedeba−1, ( ( ( ( e+f )d+fe )c+fed )b+fedc )a+fedcb,
( ( ( d+f )c+fe )b+fed )a+edcb+fedc, ( ( c+f )b+fe )a+dcb
+edc+fed, ( b+f )a+cb+dc+ed+fe,a+b+c+d+e+f}

$A_7$   {gfedcba−1, ( ( ( ( ( f+g )e+gf )d+gfe )c+gfed )b+gfedc )a
+gfedcb, ( ( ( ( e+g )d+gf )c+gfe )b+gfed )a+fedcb +gfedc, ( ( ( d+g )c+gf )b+gfe )a+edcb+fedc+gfed,
((c+d)b+gf)a+dcb+edc+fed+gfe, ( b+g )a+cb+dc+ed+
fe+gf,a+b+c+d+e+f+g}

MA$_7$ {a$^2$bc+ab$^2$c+abc$^2$+abc+ab+ac+bc,a$^2$b$^2$c+ab$^2$c$^2$
+a$^2$bc+abc+bc+a+c,a$^2$b$^2$c$^2$+a$^2$b$^2$c+ab$^2$c+abc+ac+c+1}

MA$_5$ {a+b+c+d+e,ab+bc+cd+de+ea,abc+bcd+cde+dea
+eab,bcd+bcde+cdea+deab+eabc,abcde−1}

$K_n$ indicates a n+1 variable "Katsura system".

The equation is defined under the condition $z_p = z_{-p}$
and $z_p = 0(|p| > n)$ as follows.

{$z_p − \Sigma^n_{i=-n} z_i z_{p-i}(p=0, \cdots n-1), \Sigma^n_{p=-n} z_p − 1$}

The variable order: {$z_n, z_{n-1}, \cdots, z_0$}

Rose means "Rose system".

{u$_4$−20/7a$_{46}$$^2$,
a$_{46}$$^2$u$_3$$^4$+7/10a$_{46}$u$_3$$^4$+7/48u$_3$$^4$−50/27a$_{46}$$^2$−35/27a$_{46}$−49/216,
a$_{46}$$^5$u$_4$$^3$+7/5a$_{46}$$^4$u$_4$$^3$+609/1000a$_{46}$$^3$u$_4$$^3$+49/1250a$_{46}$$^2$u$_4$$^3$
−27391/800000a$_{46}$u$_4$$^3$−1029/160000u$_4$$^3$+3/7a$_{46}$$^5$u$_3$u$_4$$^2$+3/5a$_{46}$$^6$u$_3$u$_4$$^2$
+63/200a$_{46}$$^3$u$_3$u$_4$$^2$+147/2000a$_{46}$$^2$u$_3$u$_4$$^2$+4137/800000a$_{46}$u$_3$u$_4$$^2$
−7/20a$_{46}$$^4$u$_4$−77/125a$_{46}$$^3$u$_3$$^2$u$_4$−23863/60000a$_{46}$$^2$u$_3$$^2$u$_4$
−1078/9375a$_{46}$u$_3$$^2$u$_4$−24353/1920000u$_3$$^2$u$_4$−3/20a$_{46}$$^4$u$_3$$^3$−21/100a$_{46}$$^3$u$_3$$^3$
−91/800a$_{46}$$^2$u$_3$$^3$−5887/200000a$_{46}$u$_3$$^3$−343/128000u$_3$$^3$}

The variable order: {u$_3$, u$_4$, a$_{46}$}

In Table 4, the columns of the "modular computing" and "demodular computing" are the computation time according to each algorithm, and the unit is second. In the column of "option", "L" indicates a lexicographical order, R indicates an all degree inverse lexicographical order and H indicates a homogenization.

The "ratio" is <the execution time of the demodular/the execution time of the modular> and indicates an effect provided by the modular computing.

In the column of "ratio" of Table 4, ">n" is a value conjectured from a result of trying to formalize some unnecessary pairs actually, and in reality it is thought that the value will be bigger.

The Gröbner basis is not computed without executing the homogenization in relation to any examples except $K_5$ shown in Table 4. Especially, there are many cases that the memory usage becomes so huge that the computation will become inexecutable in the end, when the homogenization is not executed.

It is thought that the ratio will be larger in big problems like $K_6$, $A_7$, since the accelerating of ten times or so is achieved by the homogenization in the result for $K_5$.

Accordingly, a high speed method for generating Gröbner basis can be given to a wider range of problems by the combination of the modular computing and the homogenization, compared with the case of the modular computing only.

Further, the algorithms of the computing in embodiment 2 will be listed as follows. The Gröbner basis computing by these algorithms is the same as the embodiment 1 except the homogenization.

```
<modular computing (without homogenization)>
modular Gröbner(F)
Input:    A Polynomial set F ⊂ Z [x₁, . . . , xₙ]
Output:   The reduced Gröbner basis G of Id(F)
          in Q [x₁, . . . , xₙ]
again:
p ← a new prime                    (select a prime
                                    number p)
G ← modular Gröbner candidate(F, p) (generate the
                                    Gröbner basis
                                    candidate)
if G = failure then go to again    (The Gröbner basis
                                    candidate checking
                                    executes the
                                    computing again when
                                    it is not the
                                    Gröbner basis
                                    checking candidate)
G ← Gröbner test(F, G)             (the Gröbner basis
                                    checking)
if G = failure then go to again    (execute the
                                    computing again
                                    when it is not the
                                    Gröbner basis)

< modular computing (with homogenization) >
modular Gröbner with homogenization(F)
Input:    A polynomial set F
Output:   The reduced Gröbner basis G of Id(F)
define the appropriate ordering in Rₕ according to the
ordering in R
again:
p ← a new prime
G ← modular Gröbner candidate(F*, p)  (homogenization)
if G = failure then go to again
G ← Gröbner test(F, G*)               (dehomogenization)
if G = failure then go to again
return G
(F*: homogenization; G*:dehomogenization)
<generation of Gröbner basis candidate>
modular Gröbner candidate(F, p)
Input:    A polynomial set F ; a prime p
Output:   A candidate of a Gröbner basis G of Id(F) or failure
if∃ f ∈ Fs. t. ¬ Valid (p, f)then return fail-
ure
G ← F ; Gₚ ← { φ (f) | f ∈ G}
D ← {{f, g} | f, g ∈ G ; f ≠ g}    (create the set D
                                    consisting of all
                                    polynomial pairs
                                    constructed from
                                    the input polynomial
                                    set F)
repeat {
D ← D\Useless Pairs (D)             (remove the element
                                    found to be
                                    normalized to 0
                                    by a criterion
                                    without
                                    computing from
                                    D)
if D = Void Set then return G      (output F if D is an
                                    empty set)
else {C ← Select Pair (D) ; D ← D\{C}}
P ← S Poly (C)                      (create a S polynomial
                                    P, normalize it by F
                                    and describe the
                                    normalization of P as
                                    NF (P,F))
(1)  if NF ( φ (P), Gₚ) ≠ 0 then {
                                    (compute the
                                    normalization format of
                                    the polynomial pair
                                    regarding p as the
                                    modulus)
(2)  t ← NF (P, G)
     if ¬ Valid (p, t) then return failure
     D ← D ∪ {{f, t} | f ∈ G}
     G ← G ∪ {t} ; Gₚ ← Gₚ ∪ { φ (t)}
                                    (compute the
                                    normalization format on
                                    the rational number only
                                    when the normalization
                                    format in the modulus p
                                    is not 0)
     }
}
       In the algorithm, "¬ Valid" means "not Valid".
<Gröbner basis checking>
Gröbner test (F, G)
Input:  Polynomial sets F, G s.t. Id (G) ⊂ Id ( F)
Output: The reduced Gröbner basis of F or failure
(R₁)   G ← G\{g ∈ G | ∃ h ∈ G\{g} s.t. HT (h) | HT
        (g)}
        (remove the redundant bases regarding the set G
        as the Gröbner basis)
(R₂)   G ← Inter Reduce (G) = {NF (g, G)\{g} | g ∈ G}
```

|     | -continued |
| --- | --- |
| (C₁) | (take out one g from G and normalize g in any elements except g)<br>D ← { {f,g} f, g ∈ G ; f ≠ g}<br>D ← D\Useless Pairs (D)<br>if∃ {f, g} ∈D s.t. NF (S poly (f, g), G) ≠ 0<br>then return failure<br>(remove the pairs found to be normalized to 0 by a criterion from D.<br>create the S polynomial from each pair of D, normalize it by G and execute the computing again if it is not 0) |
| (C₂) | if∃ f ∈ F s.t. NF (f, G) ≠ 0 then return failure<br>return G<br>(normalize each element of F by G and execute the computing again if it is not 0) |

In the above mentioned algorithm, the following items are refereed to.

• Valid(p,f) returns true if p ∤ HC(f) else returns false.

The present invention is not merely provided with a computational feature that it can generate the Gröbner basis at a high speed, but it can also lessen the memory capacity which is the hard asset of the computer. In the traditional method, the resources are wasted, since it is impossible to predict the last result of the Gröbner basis to be obtained, and the intermediate formula usually becomes a huge number of digits, so the mass storage memory must be set up previously. To the contrary, the present invention can save the memory capacity and can make a contribution to the high-speed-computing.

What is claimed is:

1. A device for generating Gröbner bases, provided with a computer for executing a Buchberger computing to generate the Gröbner basis based on a polynomial set F described in a memory and representing a plurality of simultaneous algebraic equations in relation to a model in which restrictions among parameters are given by the simultaneous equations, having a memory saving control unit for obtaining a polynomial set $F_1$ generated finally as a Gröbner basis candidate, said memory saving control unit comprising:

prime number selection means for selecting a prime number;

first computing means for computing a normalization format of the polynomial pair regarding p as the modulus;

determination means for determining whether the normalization format in said modulus p is 0 or not;

second computing means for computing said normalization format on a rational number when it is determined by said determination means that the normalization format in said modulus p is not 0; and omission means for omitting the computation of the normalization format on the rational number regarding the normalization format on the rational number as 0, when it is determined by said determination means that the normalization format in said modulus p is 0.

2. A device for generating Gröbner bases according to claim 1, further comprising:

Gröbner basis checking means for computing the normalization format of the polynomial pair generated from the obtained polynomial set $F_1$;

Gröbner basis determination means for determining that said $F_1$ is the Gröbner basis of said F, when all elements of the S polynomial and F of the all polynomial pairs generated from said $F_1$ are normalized to 0 in said $F_1$ by the ideal equality checking which confirms that all elements of said polynomial set F are normalized to 0 in said $F_1$; and recomputing control means for obtaining the polynomial set $F_1$ for the second time recovering said prime number p by said prime number selection means, when the determination by said Gröbner basis determination means is failed.

3. A device for generating Gröbner bases according to claim 1, wherein said second computer means computes said normalization format on the rational number at once whenever it is determined that the normalization format in the modulus p obtained by said first computing means is not 0.

4. A device for generating Gröbner bases according to claim 3, further comprising:

Gröbner basis candidate checking means for determining whether a head coefficient of the Gröbner basis candidate is divisible by the prime number p or not and outputting the head coefficient as a Gröbner basis candidate only when it is not divisible.

5. A device for generating Gröbner bases according to claim 1, further comprising:

homogenization means for homogenizing previously the polynomial F which will be an object; and dehomogenization means for dehomogenizing the polynomial $F_1$ which was obtained finally.

6. A method for generating Gröbner bases which creates a set D consisting of the all polynomial pairs constructed from an input polynomial set F, and executes a Buchberger computing so as to generate the Gröbner basis based on a polynomial set F described in a memory and representing a simultaneous algebraic equations in relation to a model in which restrictions among parameters are given by the simultaneous equations by repeating in a computer following steps ① through ④:

① removing the element which is found to be normalized to 0 by a certain strategy without computing from D;

② continuing the computation of F when D is an empty set, taking out the element C from D by a certain strategy and regarding the rest as D again when D is not an empty set;

③ creating the S polynomial P from the polynomial pair C, normalizing it by F and describing the normalization of P as NF (P, F); and ④ adding all of the polynomial pairs consisting of each element of F and NF (P, F) to D, and adding NF (P, F) to F when NF (P, F) is not 0, said method comprising the steps of:

a) selecting a prime number;

b) computing the normalization format of the polynomial pair regarding p as the modulus;

c) computing the normalization format on the rational number only when the normalization format in said modulus p is not 0;

d) omitting the computation of the normalization format on the rational number regarding the normalization format on the rational number as 0, when the normalization format in said modulus p is 0; and e) obtaining the polynomial set $F_1$ which is the Gröbner basis candidate.

7. A method for generating the Gröbner bases according to claim 6, wherein said checking step e) checks that said $F_1$ is the Gröbner basis of said F, when all elements of the S polynomial and F of the all polynomial pairs generated from said $F_1$ are normalized to 0, in relation to the polynomial set $F_1$ including the polynomial that is generated finally and is not limited to the Gröbner basis, by executing the steps of
- e-1) the Gröbner basis checking which computes the normalization format of the polynomial pair, and
- e-2) the ideal equality checking which confirms that all elements of said polynomial set F are normalized to 0 in said $F_1$, and the method further including the step of
- f) repeating after recovering p, when the checking is failed.

8. A method for generating Gröbner bases according to claim 7,
   wherein said step of (c) computes the normalization format of the polynomial pair regarding p as the modulus and computes the normalization format on the rational number at once whenever it is determined that the normalization format in the modulus p is not 0.

9. A method for generating Gröbner bases according to claim 8, further including:
   a step for determining whether the head coefficient of the normalization format computed on the rational number is divisible by the prime number p or not and continuing the computation of the normal Gröbner basis candidate only when it is not divisible.

10. A method for generating Gröbner bases according to claim 6, further comprising:
    a step for homogenizing previously the polynomial set F which will be an object; and
    a step for dehomogenizing the polynomial set $F_1$ which was obtained finally.

* * * * *